United States Patent [19]

Ravera et al.

[11] 3,989,376

[45] Nov. 2, 1976

[54] DEVICE FOR POSITIONING AND COVERING DOCUMENTS IN A REPROGRAPHIC MACHINE

[75] Inventors: Giovanni Ravera; Giorgio Siletto, both of Turin, Italy

[73] Assignee: Ing. C. Olivetti & C., S.p.A., Ivrea (Turin), Italy

[22] Filed: May 28, 1974

[21] Appl. No.: 474,293

[30] Foreign Application Priority Data
June 12, 1973  Italy .................................. 25090/73

[52] U.S. Cl. ................................................ 355/75
[51] Int. Cl. ............................................ G03b 27/62
[58] Field of Search .................. 355/75, 76, 18, 66, 355/82, 113, 117, 118, 128, 129, 130, 131, 133

[56] References Cited
UNITED STATES PATENTS

| | | | |
|---|---|---|---|
| 2,224,839 | 12/1940 | Steiner | 355/118 |
| 2,653,509 | 9/1953 | Nineberg | 355/76 |
| 2,674,933 | 4/1954 | Wigglesworth | 355/113 |
| 3,304,849 | 2/1967 | Cranskens et al. | 355/115 |
| 3,615,134 | 10/1971 | Newcomb | 355/75 |
| 3,625,610 | 12/1971 | Raymond | 355/76 |
| 3,630,620 | 12/1971 | Fackler | 355/76 |
| 3,685,905 | 8/1972 | Marshall et al. | 355/82 X |
| 3,717,411 | 2/1973 | Niesen et al. | 355/75 |
| 3,804,514 | 4/1974 | Jasinski | 355/75 |
| 3,829,215 | 8/1974 | Smitzer et al. | 355/120 |

Primary Examiner—Joseph W. Hartary
Assistant Examiner—Alan Mathews
Attorney, Agent, or Firm—I. J. Schaefer

[57] ABSTRACT

An improved device for fixing in position and covering original documents on the exposure plane of a reprographic machine which comprises a cover for fixing and covering the documents and an actuating arm for the cover, both movable between open and closed positions. The actuating arm is pivoted on the frame of the machine and is coupled by elastic means to the cover. The elastic means urges the cover towards its closed position and produces pressure by the cover on the original document when the arm is in its closed position. A latch mechanism is provided for holding the arm in its closed position and is releasable for allowing the arm and the cover to move from their closed to their open positions.

8 Claims, 7 Drawing Figures

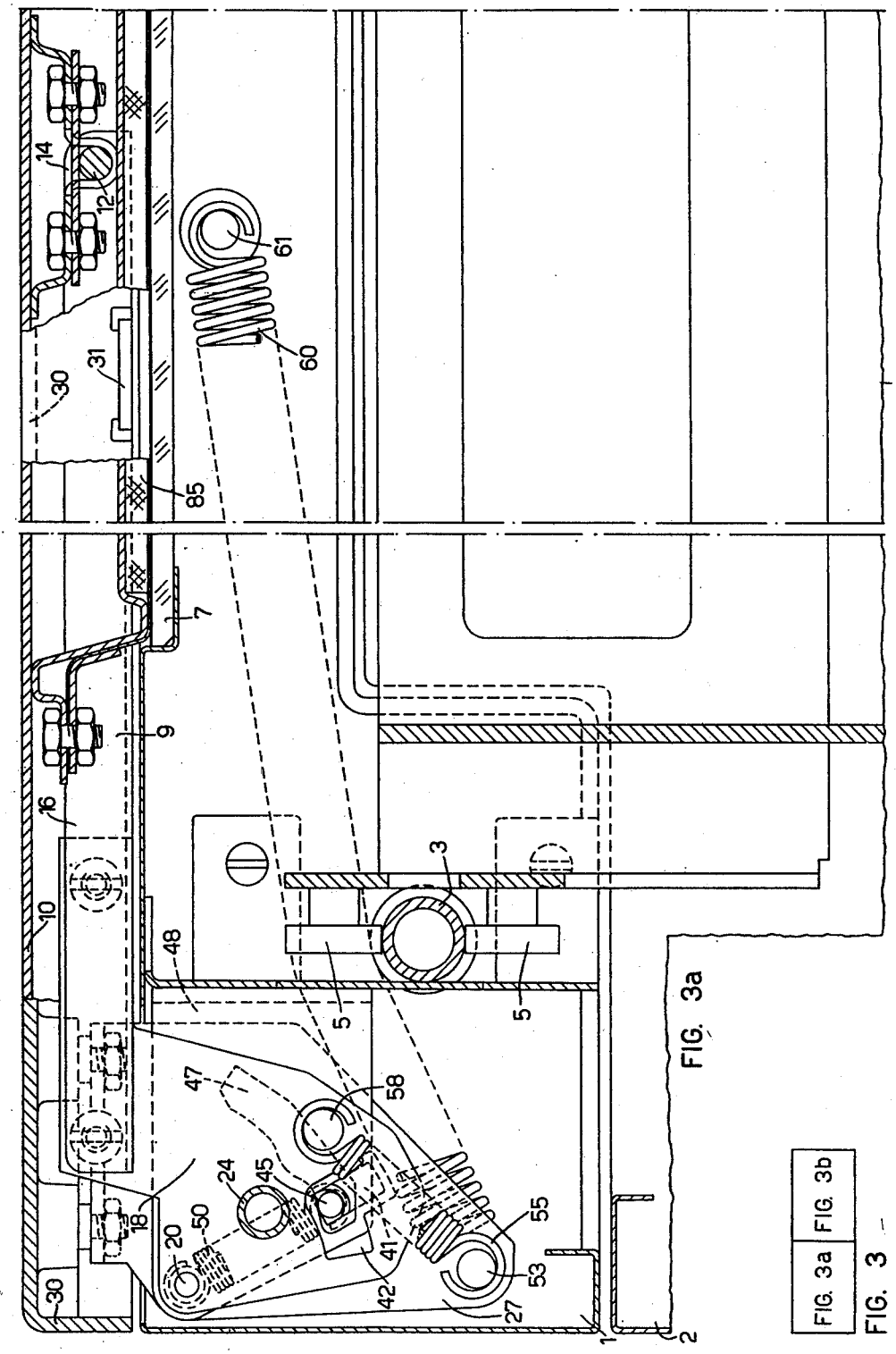

DEVICE FOR POSITIONING AND COVERING DOCUMENTS IN A REPROGRAPHIC MACHINE

BACKGROUND OF THE INVENTION

The present invention concerns an improved device for positioning and covering original documents on the illumination plane of a reprographic machine of the type in which the original is laid on the said plane during the exposure phase. In such a machine the original which is to be copied is laid over a transparent plane, the illumination plane, and there illuminated by a light source to obtain a reflected optical image on a photosensitive surface.

With a view to covering the illumination plane when the machine is not in use, to prevent external light from penetrating into the optical system during the reproducing operations and internal light from affecting the eyes of the operator, and finally to fix the original in position on the illumination plane, particularly in those machines in which the plane is carried by a mobile carriage during the copying operation, the machine is normally provided with a covering flap which may be of various types. These flaps are usually made of rigid metallic or flexible plastics material and are opaque in order to achieve the ends mentioned above.

Many of these, however, have the drawback of encouraging the operator, when several consecutive copies are being made, to forget and leave on the illumination plane the last original which has been copied. A result of this is that the operator frequently omits to make use of the flap when he is making copies of several orginals, thus avoiding the troublesome opening and closing of the covering flap, with consequent deterioration of the quality of the copies obtained.

Also, with particular reference to those machines in which the illumination plane is supported on a carriage, which moves relative to a fixed optical system, and when using originals of appreciable thickness, in particular books, many of the covering flaps are not capable of ensuring sufficiet pressure on the original to prevent displacement during movement of the carriage, with resulting loss of definition of the copies obtained.

SUMMARY OF THE INVENTION

With a view to overcoming the last mentioned problem, the present invention provides a device for fixing in position and covering original documents on the illumination plane of a reprographic machine, comprising a cover for fixing in position and covering the original and an actuating arm for the cover, both movable between open and closed positions, the actuating arm being pivoted on a body portion of the machine and being coupled by elastic means to the cover, the elastic means urging the cover towards its closed position and producing pressure of the cover on an original document when the arm is in its closed position, a latch mechanism being provided for holding the arm in its closed position and being releasable for allowing the arm and the cover to move from their closed positions to their open positions.

The elastic means allow the cover to accomodate original documents having different thickness while always maintaining adequate pressure thereon.

The latch mechanism preferably includes a lever pivoted on the said body portion, which is the carriage in a machine having the illumination plane carried by a carriage, and means are preferably arranged to operate automatically at the conclusion of a copying operation so to move the lever as to release the latch mechanism. The operator is thus freed from the need to open the cover himself and the risk of leaving documents on the illumination plane is substantially eliminated.

BRIEF DESCRIPTION OF THE DRAWINGS

The invention will be described in more detail, by way of example, with reference to the accompanying drawings, in which:

FIG. 3a is a partial section along the line I—I in FIG. 2b;

FIG. 3 shows the method of combining FIGS. 3a and 3b.

DESCRIPTION OF THE PREFERRED EMBODIMENT

Figure 3B:
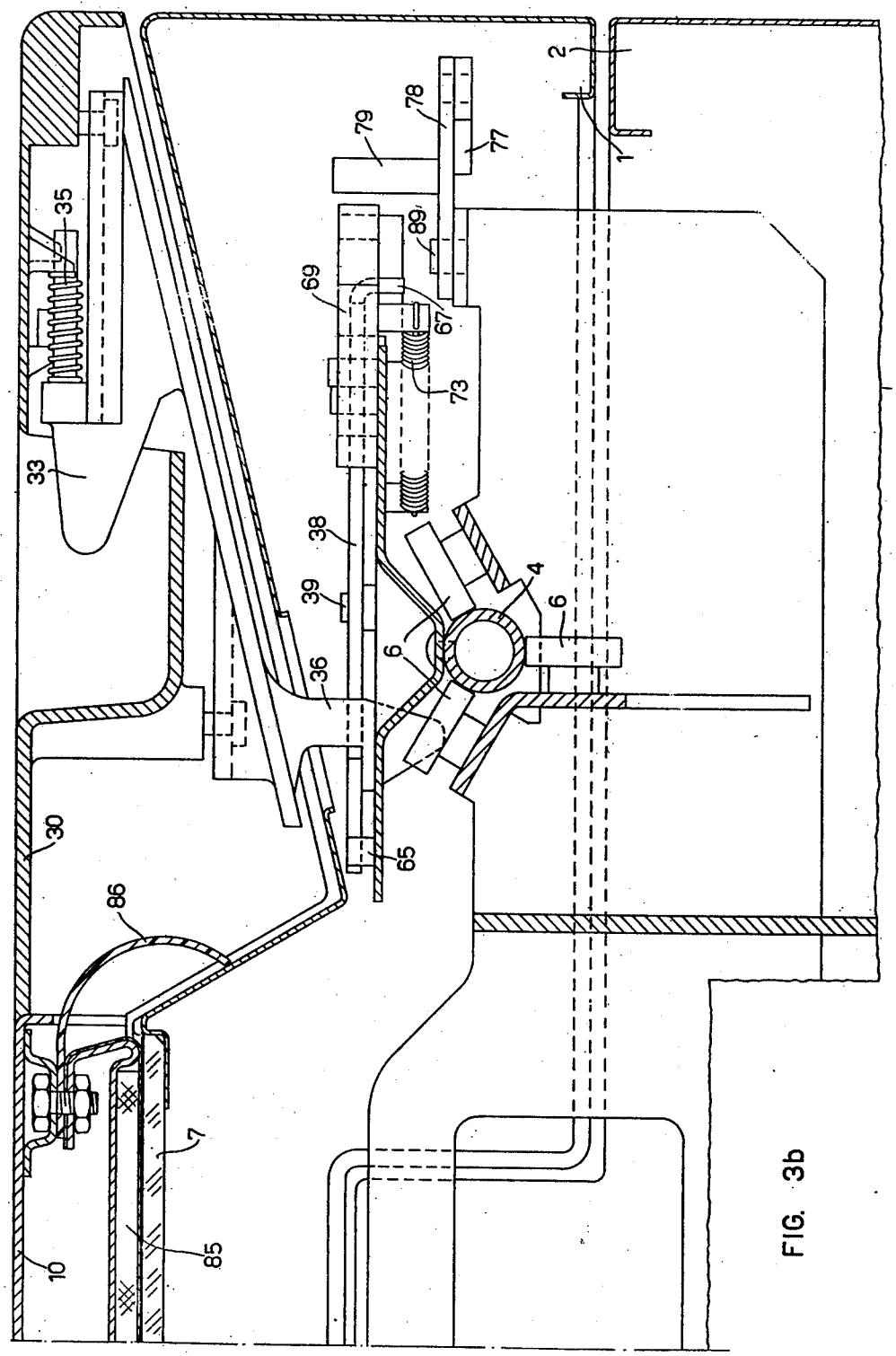
FIG. 3b is another partial section along the line I—I in FIG. 2b.

With reference to FIGS. 3a and 3b, a carriage 1 is shown mounted substantially horizontally and capable of sliding relative to the body of a mobile-carriage reprographic machine 2, by engagement of bars 3 and 4 fixed to the carriage 1, with supports 5 and 6 fixed to the body 2 of the machine. The carriage comprises a transparent rectangular plate 7, for example, of glass, constituting the illumnation plane of the machine and fixed to the carriage 1.

Figure 2A:
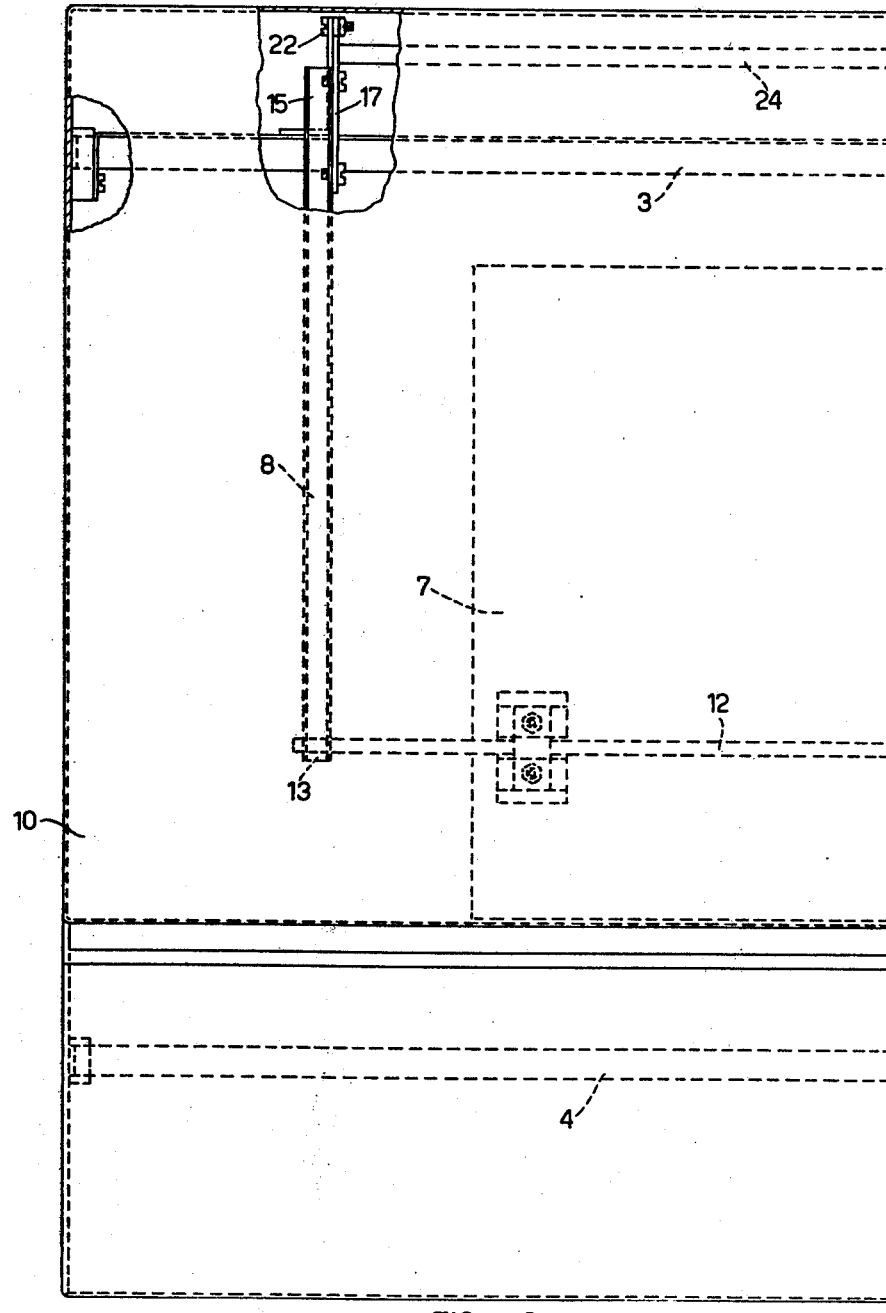
FIG. 2a is a view, partly in plan and partly a section of the device.
Figure 2:
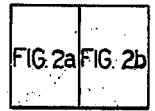
FIG. 2 shows the method of combining FIGS. 2a and 2b.

Above the illumination plane is supported by means of the two arms 8 and 9 (see FIGS. 2a and 2b), a cover 10 of rigid material, rectangular in shape, whose function is to cover and press down the original, and on which is fixed a pivot rod 12 extending in a direction parallel to the longer side of the cover 10.

Figure 1:
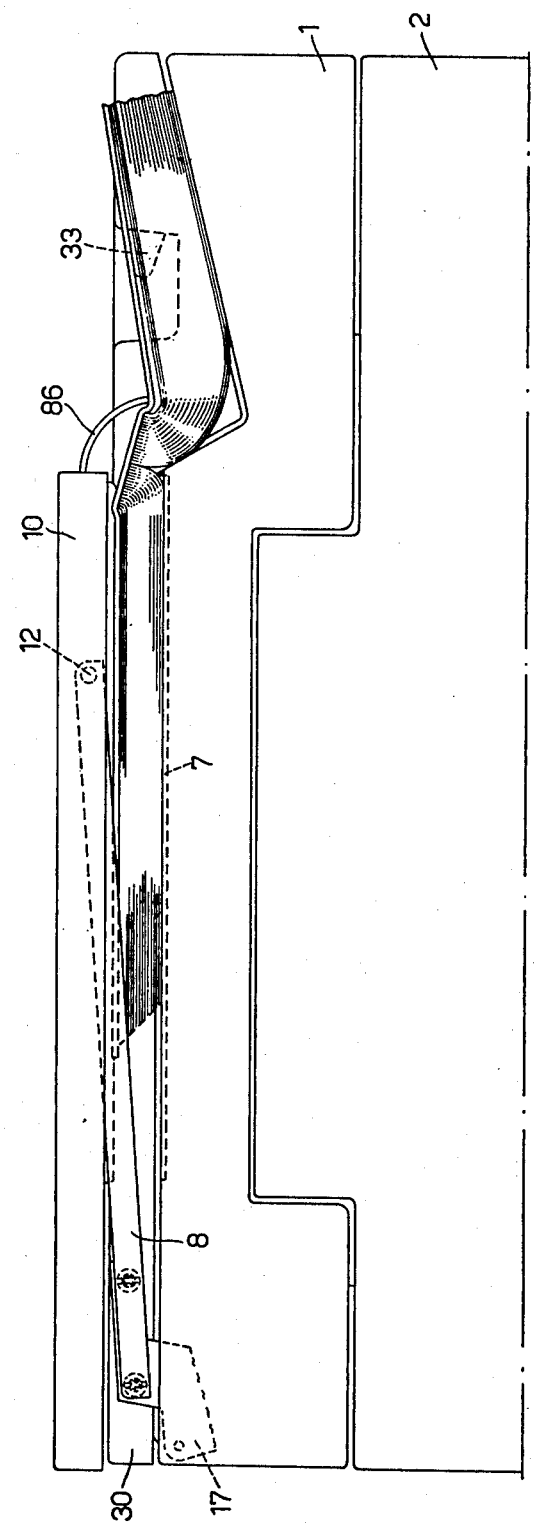
FIG. 1 is a side view of a device embodying the invention.

The arms 8 and 9 have respective ends 13 and 14 pivoted in the neighborhood of two opposite sides of the cover 10, on the ends of the pivot rod 12, and their other respective ends 15 and 16 are fixed to brackets 17 and 18 pivoted respectively on a fulcrum 22 and a pivot rod 20, both integral with the carriage 1. The arms 8 and 9 are made integral with each other by a linking crossbar 24 spanning the brackets 17 and 18. The first rod 12 is fixed to the cover, not in correspondence at the midpoint of the shorter side, but near the end of the shorter side more distant from the fulcrum 22 and pivot rod 20. Therefore the cover is supported in an unbalanced manner by the arms 8 and 9 and when lifted, tends to rotate, with reference to FIG. 1, around the axis of the pivot rod 12 in a counter-clockwise direction.

A support bridge 25, comprising two parallel flanges 26 and 27 linked by a plate 28, is also pivoted on the pivot rod 20. On the plate 28 is fixed the end of a long rectangular plate 30 having its long side approximately equal to the shorter side of the cover 10, and which acts as a pivoted actuating arm for operating the cover 10. The plate 30 carries a side tongue 31 cooperating with the cover 10.

In the flange 27 (FIG. 3a) of the bridge 25 there is a rectangular hole 41. In the bracket 18 to which the arm 9 is attached there is a hole 42 of varying width. Through these holes 41 and 42, which are in line when the cover 10 is laid on the illumination plane 7 and the plate 30 is aligned with the cover 10, there is inserted a rod 45 which also engages in a slot 47 cut in a plate 48 fixed to the carriage, and which is fixed to the flange 26 of the bridge 28.

The rod 45 extends parallel to the pivot rod 20 and below it. The rod 45 is maintained in contact with the upper edge of the slot 47 by a spring 50 which has one end attached to the rod 45 and the other end to the pivot rod 20 which is integral with the flanges 26 and 27 of the bridge 25. Another rod 53 fixed to the bridge extends parallel to the rod 45 and below it. Two traction springs 55 and 56, tensioned between the rod 53 and a peg 58 fixed on the bracket 18, couple elastically the arm 9 and the plate 30.

A traction spring 60, tensioned between the rod 53 and a peg 61 fixed to the carriage 1 tends to turn the support bridge 25 anti-clockwise (in FIG. 3a) about the pivot rod 20.

At the free end of plate 30, i.e. at the front of the machine, is fixed a manually operated key 33 which can be pulled forward against the action of a spring 35 (FIG. 3b) and carrying, integral with it, a hook 36 capable of acting with a lever 38 whose fulcrum is a vertical peg 39 fixed to the carriage 1.

The hook and lever form a latch mechanism for holding the plate 30 down in its closed position.

The lever 38 (FIG. 2b) is biased by a spring 63, and is held in the position shown in the drawing against a stop 65 fixed to the carriage, and in this position it co-operates with the hook 36. The lever 38, through a lug 67, co-operates also with a first lug 68 of a slider 69 mounted on the carriage 1. The slider has a first slot 71 slidably engaged with a stud 70 fixed to the carriage. The slider 69 is urged by a spring 73 against a stud 74 fixed to the carriage 1 and which co-operates with a second slot, namely, a cam slot 75, of the slider.

The slider 69 co-operates also with a device, not shown in the drawing, for counting the number of copies still to be made, through a link 77 which is coupled elastically to a bell-crank lever 78 pivoted on a pin 89, integral with the fixed part 2 of the machine. The lever 78 carries a stud 79 capable of co-operating with a second lug 80 of the slider 69.

The plate 30 is held down when copying is in progress by engagement of the hook 36 under the lever 38. The hook can be disengaged at any time by the operator pulling the key 33. Automatic disengagement occurs when the last copy has been counted and the link 77 pulls the lever 78 to position the stud 79 in the path of the lug 80 whereby, as the carriage completes movement to the right, the slider 69 moves to the left relative to the carriage and turns the lever 38 clockwise to disengage the lever from the hook 36.

The lower surface of the cover (FIGS. 3a and 3b) is coated with a layer 85 of soft white material in order respectively to avoid damaging the original, and to provide the optical system incorporated in the machine, and hence the photosensitive material, with a white, diffusing surface for the portion of the illumination plane not covered by the original. In addition to this, in order to prevent infiltration of external light on to the illumination plane 7, and escape of light from inside the machine with inconvenience to the operator, there is fixed along at least one edge of the cover 10 a flexible sheet 86 of opaque plastics material, acting as a light screen.

Consider initially the state of the device in the working phase of the machine, i.e. with the carriage in motion. The cover 10 for covering and pressing the original is kept pressed against an original of uniform thickness (for example, a book) (FIG. 1), and therefore in a position parallel to the plane of illumination 7, while the plate 30 is in the closure position, i.e. hooked to the lever 38 of the carriage 1. In this position, the pressure on the original is ensured by the springs 55 and 56 (FIG. 3a) kept in tension by the angular position assumed by the arms 9 and 8 and hence by the brackets 17 and 18 relative to the support bridge 25 with, which the plate 30 is integral. The tension of the spring 60 does not cause rotation of the plate 30 so long as it is held in the above-mentioned position by the hook 36.

Figure 2B:
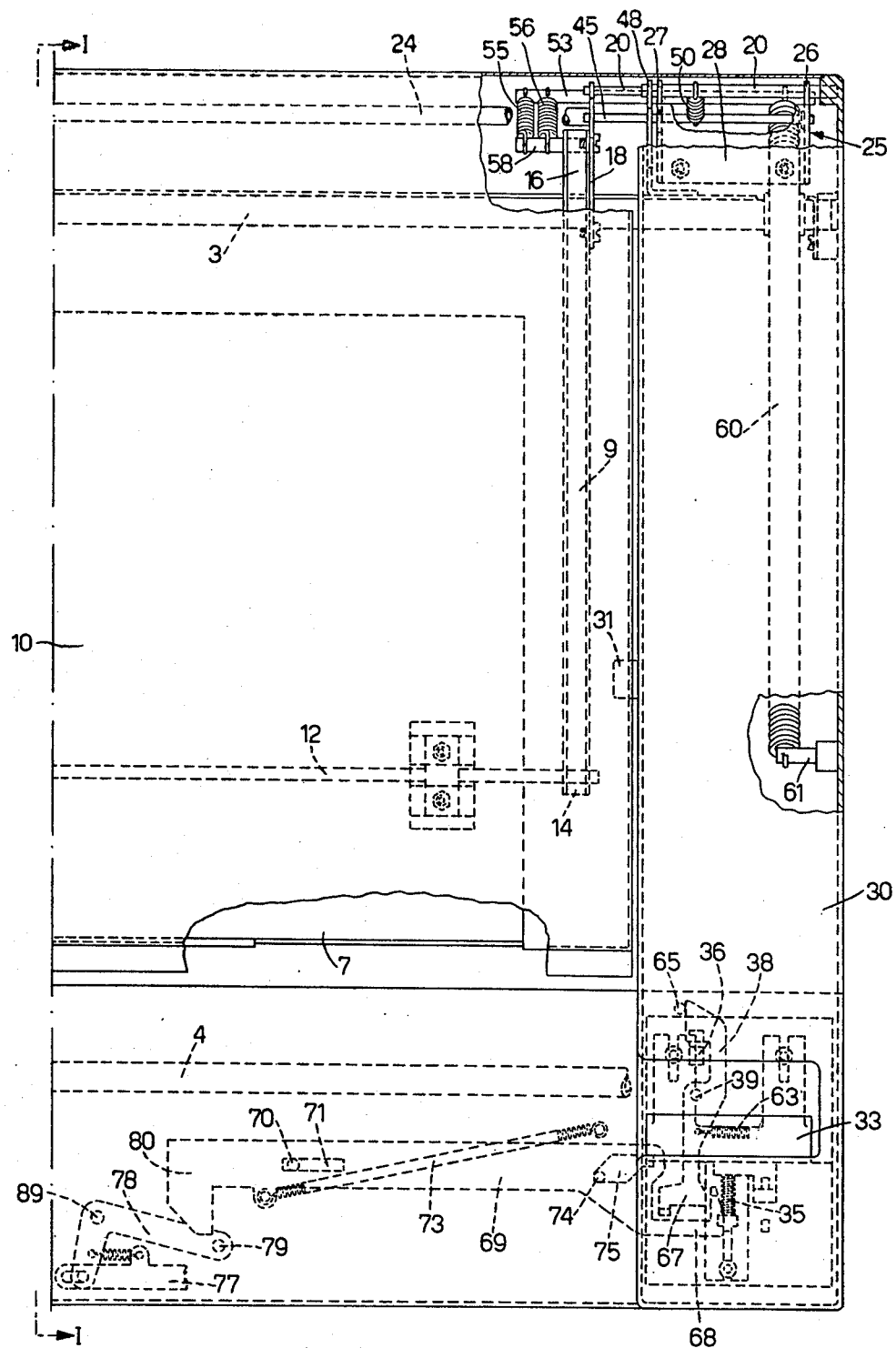
FIG. 2b is another view, partly in plan and partly in section of the device.

When the final copy has been made, i.e. the counter for the number of copies required has come to zero, and the carriage is proceeding from left to right with reference to FIG. 2b and is nearly back to its home position, the link 77, actuated by the counter, makes the lever 78 turn anti-clockwise in a well known manner, for instance by a suitable relay. An example of copy counter as well as an actuating relay suitable to be used can be found in U.S. Pat. Ser. No. 2,703,280. The stud 79 is thus carried into the path of the lug 80 of the slider 69, pulled by the carriage 1. As the course of the carriage continues towards the right, the slider is thus pulled by the peg 79 and, therefore, moves leftwards relative to the carriage against the action of the spring 73, making the lever 38 turn counter clockwise and disengaging the hook 36.

During this movement, the slider, as a result of the cam slot 75, executes a clockwise rotation and keeps its lug 68 in co-operation with the lug 67 of the lever 38, so that the lever is unable to return to its rest position, but remains pulled into the disengagement position. When the carriage stops, the lever 78 is returned to rest, and hence the slider, biased by the spring 73, is brought back into the posittion shown in the Figure, causing the lever 38 also to return to reset and, therefore, to be ready to allow the hook 36 to engage on re-closing the plate 30.

When the hook 36 is disengaged by the lever 38, the plate 30 and hence the support bridge 25 becomes free to rotate around the pivot rod 20 (FIG. 3a) under the action of the spring 60. The counterclockwise rotation of the plate 30 causes the left side of the rectangular hole 41 of the flange 27 to contact and to carry in corresponding rotation the rod 45. The rod 45, contacting the right side of the hole 42 of the bracket 18, carries in an anticlockwise rotation around the pivot 20 also the arms 8 and 9, thus lifting the cover 10 with respect to the illumination plane 7. When the cover is out of contact from the plane 7, due to the fact that it is supported in an unbalanced manner by the arm 8 and 9, it tends to rotate in a counterclockwise direction with respect to pivot 12. This last rotation is stopped by the tongue 31 of the plate 32 which, during the rotation of the arm 30, pushes against the cover 10 and tries to rotate it in a clockwise direction. The result of these contrasting forces acting upon the cover 10 is that the cover 10 aligned itself with the plate 30.

The rotation of the plate 30 and of the support arms 8 and 9 is, however, slowed down by the action of the rod 45 which is forced, by the spring 50, to ride during rotation against the upper edge of the slot 47, thus preventing rapid and damaging uncovering of the enclosed original. The maximum rotation of the cover 10 and the plate 30 is limited by the angular extend of the slot 47, and may be varied by altering the slot. In the embodiment here described, the rotation is 45°.

If the plate 30 is now lowered again, there if also a simultaneous lowering of the cover 10, due to the elastic coupling produced by the springs 55 and 56 between the support bridge 25 and the arm 9. The cover 10 is arrested when it comes into contact with the original, while the plate 30 is free to rotate until the hook 36 engages with the lever 38, thus stretching the springs 55, 56 and 60. The rod 45 is free to follow the movement of the plate 30 even after the cover 10 has stopped against the original, due to the hole 42 provided in the bracket 18 of the holding arm 9 of the cover 10. The maximum thickness of the original and hence the maximum angular position of the bracket 18 relative to the plane of illumination 7 at which it is still possible to close the plate 30 is determined by the angular aperture of the hole 42 with respect to the pivot rod 20.

This arrangement of cover and an actuating arm therefore (the plate 30) can be advantageously incorporated incorporated in an reprographic machine, its adoption being particularly effective in those machines which have a counter for the number of copies still to be made and in which the illumination plane moves on a carriage.

What we claim is:

1. In a book-copying machine having a frame and an illumination plane on which an original having a thickness up to a predetermined value is positioned during use for the copying thereof, a device for releasably fixing the original to be copies in position and covering the portion thereof on the illumination plane comprising:
   a pair of support arms pivotally mounted at one end portion on a first pivot axis on said frame and extending on opposite sides of said illumination plane;
   a cover for covering the original to be copied and pivotally mounted on the opposite sides thereof between the other end portions of the support arms for rotation about a second pivot axis parallel to the first pivot axis;
   an actuating arm pivotally mounted at one end portion on one of said sides of the illumination plane to said frame and extending adjacent to one supported side of said cover for angular displacement between a first position substantially lying in the illumination plane and second position;
   first means operatively connecting said actuating arm to said support arms for rotatiing said support arms around said first pivot axis to lift said cover with respect to said illumination plane upon rotation of said actuating arm towards it second position;
   second means operatively connecting said actuating arm to said cover for causing said cover to rotate about said second pivot axis and to align a supported side of it with said actuating arm upon rotation of said actuating arm towards its second position; and
   third means operatively connecting said actuating arm to said support arms for rotating said support arms around said first pivot axis to lower said cover until it contacts the surface of the original to be copied that is opposite the face to be copied upon rotation of the actuating arm from the second position to a position intermediate between said second and first positions and depending upon the thickness of the original positioned on the illumination plane and for pressing said cover against said opposite surface upon rotation of said actuating arm from said intermediate position to said first position thereby rotating said cover around said second pivot axis to make the cover parallel with said opposite surface.

2. A device according to claim 1 further comprising:
   spring means connected between said actuating arm and the frame of the machine for urging said arm towards its second position; and
   releasable latch means for releasably holding the actuating arm in its first position.

3. A device according to claim 2 wherein said latch means includes:
   hooking means connected to said actuating arm,
   retaining means connected to the frame and cooperating with said hooking means for holding the actuating arm in its first position; and
   manually operable means for disengaging said hooking means from said retaining means to manually release the actuating arm.

4. A device according to claim 2 further comprising:
   means connected between said frame and said actuating arm for damping, against the action of spring means, the movement of said actuating arm from its first position to its second position.

5. A device according to claim 1 further comprising:
   opaque means connected along at least one edge of the cover for light shielding the illumination plane when said actuating arm is in its first position.

6. A device according to claim 1, wherein said actuating arm is pivoted on said first axis, and said first means comprises:
   means rigidly connecting said support arms,
   a rod connected to said actuating arm and proximate the pivotally mounted one end portion thereof,
   means defining a slot in the support arm adjacent to said actuating arm and proximate the pivotally mounted one end portion thereof, and
   wherein said rod cooperates with one end of said slot for rotating the adjacent support arm around said first axis in order to lift said cover upon rotation of said actuating arm towards its second position.

7. A device according to claim 1, wherein said second means comprises:
   means mounting said cover in an unbalanced manner on said second pivot axis whereby said cover tends to rotate around said second pivot axis in a predetermined sense of rotation, and
   a tongue connected to said actuating arm and cooperating with the supported side of said cover adjacent to said actuating arm for rotating said cover in a sense opposite to said predetermined sense upon rotation of said actuating arm towards its second position.

8. A device according to claim 6, wherein said third means comprises:
   said slot having an arcuate shape with the center of curvature in said first pivot axis and an angular extension between said one end and the opposite end,
   said rod being movable into said slot from said one side to the opposite end to allow angular displacements between said actuating arm and the adjacent support arm upon rotation of said actuating arm from said intermediate position to said first position, whereby said angular extension defines the predetermned maximum thickness of the original to be copied, and spring means connected between said actuating arm and said adjacent support arm and charged upon rotation of said actuating arm from said intermediate to said first positions.

* * * * *